United States Patent
Zhang

(10) Patent No.: US 12,273,535 B2
(45) Date of Patent: Apr. 8, 2025

(54) INTER PREDICTION ENCODING METHOD, APPARATUS, AND DEVICE, AND READABLE STORAGE MEDIUM

(71) Applicant: Tencent Technology (Shenzhen) Company Limited, Guangdong (CN)

(72) Inventor: Hongshun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 232 days.

(21) Appl. No.: 18/123,650

(22) Filed: Mar. 20, 2023

(65) Prior Publication Data

US 2023/0232020 A1 Jul. 20, 2023

Related U.S. Application Data

(63) Continuation of application No. PCT/CN2022/091617, filed on May 9, 2022.

(30) Foreign Application Priority Data

Jun. 7, 2021 (CN) .......................... 202110629001.2

(51) Int. Cl.
  *H04N 19/159* (2014.01)
  *H04N 19/139* (2014.01)
  (Continued)

(52) U.S. Cl.
  CPC .......... *H04N 19/159* (2014.11); *H04N 19/139* (2014.11); *H04N 19/176* (2014.11);
  (Continued)

(58) Field of Classification Search
  USPC ..................................................... 375/240.13
  See application file for complete search history.

(56) References Cited

U.S. PATENT DOCUMENTS 6,243,418 B1 6/2001 Kim

FOREIGN PATENT DOCUMENTS

| CN | 111818342 A | * 10/2020 |
| CN | 111953997 A | 11/2020 |

(Continued)

OTHER PUBLICATIONS

International Search Report in PCT/CN2022/091617, mailed on Aug. 18, 2022, 4 pages.

(Continued)

*Primary Examiner* — Amir Shahnami
(74) *Attorney, Agent, or Firm* — ArentFox Schiff LLP

(57) ABSTRACT

In an inter prediction encoding method, a picture is divided into a plurality of coding units. Motion estimation traversal is performed on motion vector predictions (MVPs) in a specified inter prediction mode to obtain candidate motion vectors. A motion vector set is determined from the MVPs and the candidate motion vectors. The motion vector set includes a target MVP from the MVPs and a target motion vector from the candidate motion vectors. Interpolation mode transversal and motion mode transversal are performed for each of the coding units based on the motion vector set to obtain a target interpolation mode and a target motion mode corresponding to the respective coding unit.

20 Claims, 8 Drawing Sheets

(51) Int. Cl.
*H04N 19/176* (2014.01)
*H04N 19/184* (2014.01)
*H04N 19/52* (2014.01)
*H04N 19/567* (2014.01)

(52) U.S. Cl.
CPC ........... *H04N 19/184* (2014.11); *H04N 19/52* (2014.11); *H04N 19/567* (2014.11)

(56) References Cited

FOREIGN PATENT DOCUMENTS

| | | |
|---|---|---|
| CN | 112312131 A | 2/2021 |
| WO | 2019192301 A1 | 10/2019 |

OTHER PUBLICATIONS

Written Opinion in PCT/CN2022/091617, mailed on Aug. 18, 2022, 4 pages.
Extended European Search Report and Search Opinion received for European Application No. 22819274.6, mailed on Aug. 16, 2024, 12 pages.

\* cited by examiner

INTER PREDICTION ENCODING METHOD, APPARATUS, AND DEVICE, AND READABLE STORAGE MEDIUM

RELATED APPLICATIONS

This application is a continuation of International Application No. PCT/CN2022/091617, entitled "ENCODING METHOD AND APPARATUS USING INTER-FRAME PREDICTION, DEVICE, AND READABLE STORAGE MEDIUM" and filed on May 9, 2022, which claims priority to Chinese Patent Application No. 202110629001.2, entitled "INTER PREDICTION ENCODING METHOD AND APPARATUS, DEVICE, AND READABLE STORAGE MEDIUM" and filed on Jun. 7, 2021. The entire disclosures of the prior applications are hereby incorporated by reference in their entirety.

FIELD OF THE TECHNOLOGY

Embodiments of this disclosure relate to the field of video processing, including inter prediction.

BACKGROUND OF THE DISCLOSURE

In the process of video coding, an image frame input to an encoder is divided into multiple coding units (CUs), where each coding unit may correspond to multiple prediction modes and transform units. For example, each coding unit may correspond to an intra prediction mode and an inter prediction mode, and the inter prediction mode may include four single reference frame modes: NEARESTMV, NEARMV, GLOBALMV and NEWMV.

In related technologies, for any reference frame in the NEWMV mode, it is necessary to obtain all Motion Vector Predictions (MVPs) in the NEWMV mode, and then perform motion estimation, traversal based on nine interpolation methods and traversal based on four motion modes for each MVP, and finally select an optimal MVP, an optimal motion vector, an optimal interpolation method and an optimal motion mode corresponding to the optimal MVP.

However, when inter prediction in the NEWMV mode is performed in the foregoing manner, a rate-distortion cost of each possible combination needs to be calculated, resulting in high computational complexity and low coding efficiency.

SUMMARY

Embodiments of this disclosure include an encoding method, apparatus, device, and computer-readable storage medium for inter prediction, which can improve the coding efficiency of inter prediction in an NEWMV mode. Technical solutions include the following:

According to one aspect, an inter prediction encoding method is provided. In the inter prediction encoding method, a picture is divided into a plurality of coding units. Motion estimation traversal is performed on motion vector predictions (MVPs) in a specified inter prediction mode to obtain candidate motion vectors. A motion vector set is determined from the MVPs and the candidate motion vectors. The motion vector set includes a target MVP from the MVPs and a target motion vector from the candidate motion vectors. Interpolation mode transversal and motion mode transversal are performed for each of the coding units based on the motion vector set to obtain a target interpolation mode and a target motion mode corresponding to the respective coding unit.

According to another aspect, an inter prediction encoding apparatus including processing circuitry is provided. The processing circuitry is configured to divide a picture into a plurality of coding units. The processing circuitry is configured to perform motion estimation traversal on motion vector predictions (MVPs) in a specified inter prediction mode to obtain candidate motion vectors. The processing circuitry is further configured to determine a motion vector set from the MVPs and the candidate motion vectors. The motion vector set includes a target MVP from the MVPs and a target motion vector from the candidate motion vectors. The processing circuitry is configured to perform interpolation mode transversal and motion mode transversal for each of the coding units based on the motion vector set to obtain a target interpolation mode and a target motion mode corresponding to the respective coding unit.

According to another aspect, a computer device is provided, the computer device including a processor and a memory, the memory storing a computer program, the computer program being loaded and executed by the processor to implement the inter prediction encoding method.

According to another aspect, a non-transitory computer-readable storage medium is provided, the computer-readable storage medium storing instructions which when executed by a processor cause the processor to implement the inter prediction encoding method.

According to another aspect, a computer program product or computer program is provided, the computer program product or computer program including computer instructions stored in a computer-readable storage medium. A processor of a computer device reads the computer instructions from the computer-readable storage medium, and the processor executes the computer instructions, to enable the computer device to execute the inter prediction encoding method.

Technical solutions provided in the embodiments of this disclosure may include at least the following beneficial effects.

In a scenario of encoding an image frame using a specified inter prediction mode (for example, NEWMV mode), a combination including a target MVP and a target motion vector (for example, an optimal combination) is determined first, and then an optimal interpolation mode and an optimal motion mode are determined for this combination, i.e., it is not necessary to perform interpolation mode traversal and motion mode traversal for all MVPs and motion vectors, thereby reducing the calculation amount of rate-distortion costs and the computational complexity, and further improving the encoding efficiency in the specified inter prediction mode.

DESCRIPTION OF EMBODIMENTS

First, an environment for implementing a method of the embodiments of this disclosure is described.

An inter prediction encoding method provided in embodiments of this disclosure may be applied to a terminal or a server.

For example, when the inter prediction encoding method is applied to a terminal, the terminal includes but is not limited to a mobile phone, a computer, an intelligent voice interaction device, a smart household appliance, an on-board terminal, and the like. When the terminal is implemented as an on-board terminal, the method provided in the embodiments of this disclosure may be applied to an on-board scenario, to be specific, used for inter prediction encoding of a video on the on-board terminal as a part of an intelligent traffic system (ITS). The intelligent traffic system is a comprehensive transportation system that effectively applies advanced technologies (such as information technology, computer technology, data communication technology, sensor technology, electronic control technology, automatic control theory, operational research, artificial intelligence, etc.) to transportation, service control and vehicle manufacturing to strengthen the relationship among vehicles, roads and users, to ensure safety, improve efficiency, improve environment and save energy.

When the inter prediction encoding method is applied to a server, the server may encode a video, and send an encoded video stream to a terminal or another server. The server may be an independent physical server, or a server cluster or distributed system composed of multiple physical servers, or a cloud server that provides basic cloud computing services such as cloud services, cloud databases, cloud computing, cloud functions, cloud storage, network services, cloud communication, middleware services, domain name services, security services, content delivery network (CDN), and big data and artificial intelligence platforms.

In some embodiments, the server may also be implemented as a node in a blockchain system. In an example, the blockchain is a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

Second, examples are given to describe the coding framework, CU partitioning type, intra prediction mode and MVP derivation process involved in the embodiments of this disclosure.

Figure 1:
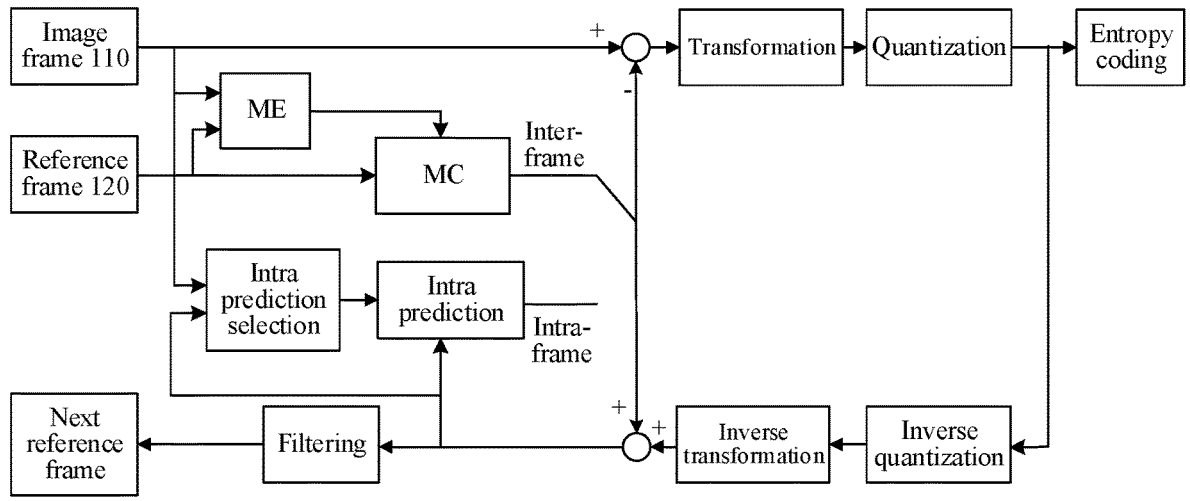
FIG. 1 is a schematic diagram of a standard coding framework according to an embodiment of this disclosure.

FIG. 1 is a schematic diagram of a standard coding framework according to an embodiment of this disclosure. As shown in FIG. 1, when an image frame 110 is sent to an encoder, the encoder first partitions the image frame 110 into coding tree units (CTUs), and then further partitions the coding tree units to obtain coding units (CUs). Each CU may correspond to multiple prediction modes and transform units (TUs). The encoder performs prediction for each CU by using the prediction modes, and obtains predicted values (MVPs) corresponding to each CU. The prediction performed for each CU may include inter prediction and intra prediction.

During the inter prediction, first, motion estimation (ME) is performed on the image frame 110 and a reference frame 120, and then motion compensation (MC) is performed on a result of the motion estimation to obtain a predicted value. The predicted value is subtracted from input data (i.e., an actual motion vector (MV) value) to obtain a residual (Motion Vector Difference, MVD). Then the residual is transformed and quantized to obtain a residual coefficient. The residual coefficient is sent to an entropy coding module to output a bit stream. At the same time, after the residual coefficient is inversely quantized and inversely transformed, a residual value of a reconstructed image is obtained. After the residual value and the predicted value are summed up, the reconstructed image is obtained. After being filtered, the reconstructed image enters a reference frame queue as a reference frame of the next image frame, so that subsequent frames can be encoded backward in sequence.

In the process of intra prediction, first, intra prediction mode selection is performed based on the image frame 110, and intra prediction is performed based on the reconstructed image and a current frame to obtain an intra prediction result.

Figure 2:
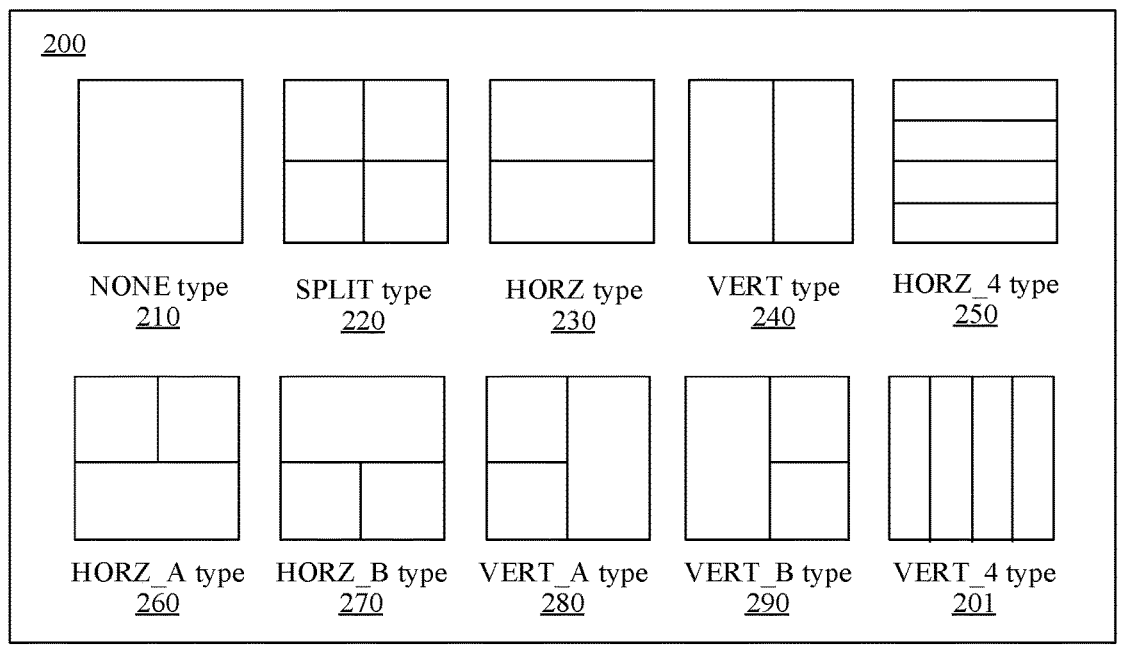
FIG. 2 is a schematic diagram of CU partitioning types according to an embodiment of this disclosure.

FIG. 2 is a schematic diagram of a CU partitioning type according to an embodiment of this disclosure. As shown in FIG. 2, CU partitioning types 200 include: NONE type 210; SPLIT type 220; HORZ type 230; VERT type 240; HORZ_4 type 250; HORZ_A type 260; HORZ_B type 270; VERT_A type 280; VERT_B type 290; and VERT_4 type 201.

Based on the above CU partitioning types, there are 22 block sizes for CUs, namely, 4×4, 4×8, 8×4, 8×8, 8×16, 16×8, 16×16, 16×32, 32×16, 32×32, 32×64, 64×32, 64×64, 64×128, 128×64, 128×128, 4×16, 16×4, 8×32, 32×8, 16×64 and 64×16 respectively.

Prediction modes of a CU include intra prediction modes and inter prediction modes. When a prediction type is determined, first, in the same prediction type, different prediction modes under this prediction type are compared to find an optimal prediction mode under this prediction type. For example, in the intra prediction type, different intra prediction modes are compared to determine an optimal intra prediction mode under the intra prediction type. Rate-distortion costs of different intra prediction modes may be compared to determine the intra prediction mode with a minimum rate-distortion cost. For example, in the inter prediction type, different inter prediction modes are compared to determine an optimal prediction mode in the inter prediction type. Rate-distortion costs of different inter prediction modes may be compared to determine the inter prediction mode with a minimum rate-distortion cost. Then the intra prediction modes are compared with the inter prediction modes to find an optimal prediction mode for the current CU. For example, the rate-distortion costs of the optimal intra prediction and the optimal inter prediction mode are compared, and the mode with a minimum rate-distortion cost is determined as the optimal prediction mode for the current CU. In addition, TU transformation is performed on the CU, and each CU corresponds to multiple transformation types, from which an optimal transformation type is found. Then different CU partitioning types are compared, and an optimal CU partitioning type is found according to the rate-distortion cost. Finally, the image frame is divided into CUs.

In some embodiments, the inter prediction modes include four single reference frame modes, namely, NEARESTMV, NEARMV, GLOBALMV and NEWMV, and eight combined reference frame modes, namely, NEAREST_NEARESTMV, NEAR_NEARMV, NEAREST_NEWMV, NEW_NEARESTMV, NEAR_NEWMV, NEW_NEARMV, GLOBAL_GLOBALMV and NEW_NEWMV. In the NEARESTMV mode and the NEARMV mode, a motion vector (i.e., MV) of a prediction block is derived from surrounding block information, and there is no need to transmit the motion vector difference (MVD). In the NEWMV mode, the MVD needs to be transmitted. In the GLOBALMV mode, MV information of the CU is derived from global motion.

The NEARESTMV, NEARMV and NEWMV modes all depend on the derivation of MVPs. For a given reference frame, based on the AV1 standard, four MVPs are calculated according to protocol rules.

Figure 3:
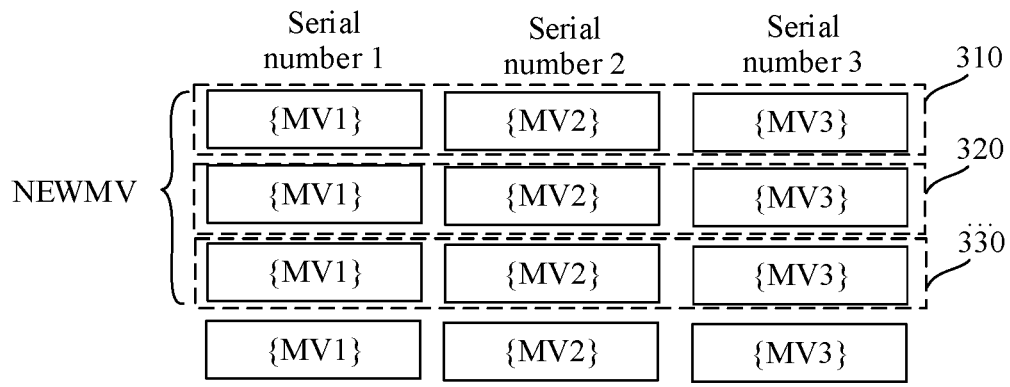
FIG. 3 is a schematic diagram of a position of an MVP in a single reference frame mode corresponding to inter prediction according to an embodiment of this disclosure.

For example, in the process of deriving MVPs, first, information of CUs in the first, third and fifth columns on the left of and the first, third and fifth rows on the top of the current CU is scanned in a hopping manner, the CUs using the same reference frame are selected, and MVs of the CUs using the same reference frame are de-duplicated. If the quantity of MVs whose reference frames are not the same is less than (or equal to) 8, first, the requirement on CUs is relaxed, CUs using reference frames in the same direction are selected, and MVs of the CUs using reference frames in the same direction are de-duplicated and added. If the quantity of MVs is still less than (or equal to) 8, global motion vectors are added. Eight MVs are selected and sorted by importance, and the four MVs with the highest importance are obtained. The zeroth MV is in the NEARESTMV mode; the first MV to the third MV are in the NEARMV mode; the NEWMV mode uses one of the zeroth MV to the second MV. For example, referring to FIG. 3, which shows a schematic diagram of a position of an MVP in a single reference frame mode corresponding to inter prediction according to an embodiment of this disclosure. As shown in FIG. 3, after the four MVs with the highest importance are selected based on the above MVP derivation process, the NEWMV mode uses one of the zeroth MV 310, the first MV 320 and the second MV 330 as the MVP.

In some embodiments, each of the above inter prediction modes of the inter prediction type corresponds to a different reference frame. For example, refer to Table 1 below.

TABLE 1

| Reference frame type | Value | Meaning |
| --- | --- | --- |
| INTRA_FRAME | 0 | Intra prediction |
| LAST_FRAME | 1 | The image frame sequence is smaller than the reference frame closest to the current frame, forward reference |

TABLE 1-continued

| Reference frame type | Value | Meaning |
| --- | --- | --- |
| LAST2_FRAME | 2 | The image frame sequence is smaller than the reference frame second closest to the current frame in the current frame, forward reference |
| LAST3_FRAME | 3 | The image frame sequence is smaller than the reference frame third closest to the current frame in the current frame, forward reference |
| GOLDEN_FRAME | 4 | The image frame sequence is smaller than an I frame or GPB frame corresponding to the current frame, similar to a long-term reference frame |
| BWDREF_FRAME | 5 | The image frame sequence is larger than the reference frame closest to the current frame in the current frame, backward reference |
| ALTREF2_FRAME | 6 | The image frame sequence is larger than the reference frame second closest to the current frame in the current frame, backward reference |
| ALTREF_FRAME | 7 | The image frame sequence is larger than the reference frame third closest to the current frame in the current frame, backward reference |

In some embodiments, the combination relationship between the inter prediction modes and the reference frames may be as follows:

For the four single reference frame modes corresponding to the inter prediction type, there are seven reference frames, namely, LAST_FRAME, LAST2_FRAME, LAST3_FRAME, GOLDEN_FRAME, BWDREF_FRAME, ALTREF2_FRAME and ALTREF_FRAME, and there are 28 (4×7) combinations between the single reference frame modes and the reference frames.

For the eight combined reference frame modes corresponding to the inter prediction type, there are 16 reference frame combinations, namely:
{LAST_FRAME, ALTREF_FRAME};
{LAST2_FRAME, ALTREF_FRAME};
{LAST3_FRAME, ALTREF_FRAME};
{GOLDEN_FRAME, ALTREF_FRAME};
{LAST_FRAME, BWDREF_FRAME};
{LAST2_FRAME, BWDREF_FRAME},
{LAST3_FRAME, BWDREF_FRAME;
{GOLDEN_FRAME, BWDREF_FRAME},
{LAST_FRAME, ALTREF2_FRAME},
{LAST2_FRAME, ALTREF2_FRAME},
{LAST3_FRAME, ALTREF2_FRAME};
{GOLDEN_FRAME, ALTREF2_FRAME};
{LAST_FRAME, LAST2_FRAME},
{LAST_FRAME, LAST3_FRAME},
{LAST_FRAME, GOLDEN_FRAME},
{BWDREF_FRAME, ALTREF_FRAME}.

Therefore, there are 156 (7×4+16×8) combinations between the inter prediction modes and the reference frames.

In some embodiments, any of the above combinations corresponds to a maximum of three MVPs, and then the current MVP is subjected to four processes: motion estimation (where motion estimation is performed only for modes containing the NEWMV mode), combination mode type optimization, interpolation mode optimization, and motion mode optimization.

A combination mode is used to fuse predicted pixels of two reference frames. For example, an optimal combination mode type may be selected from combination modes, and predicted pixels of two reference frames are fused together based on the selected combination mode type. Each combination mode represents one predicted pixel fusion mode.

In some embodiments, the single reference frame mode and the combined reference frame mode correspond to different motion modes. The single reference frame mode corresponds to four motion modes, namely: SIMPLE (simple motion compensation), OBMC (overlapping block motion compensation), WARPED (global and local warp motion compensation), and SIMPLE(inter_intra). The combined reference frame mode corresponds to the SIMPLE mode.

In the related art, the computational complexity of the inter prediction modes, especially the NEWMV mode, can be very large. In the NEWMV mode, for each CU, it is necessary to traverse seven reference frames, traverse a maximum of three MVPs for each reference frame, perform motion estimation for each MVP, and perform interpolation based on nine modes and calculation based on 4 motion modes respectively. In other words, in the NEWMV mode, each CU corresponds to a maximum of 189 (7×3×9) interpolations and 84 (7×3×4) motion mode calculations.

Figure 4:
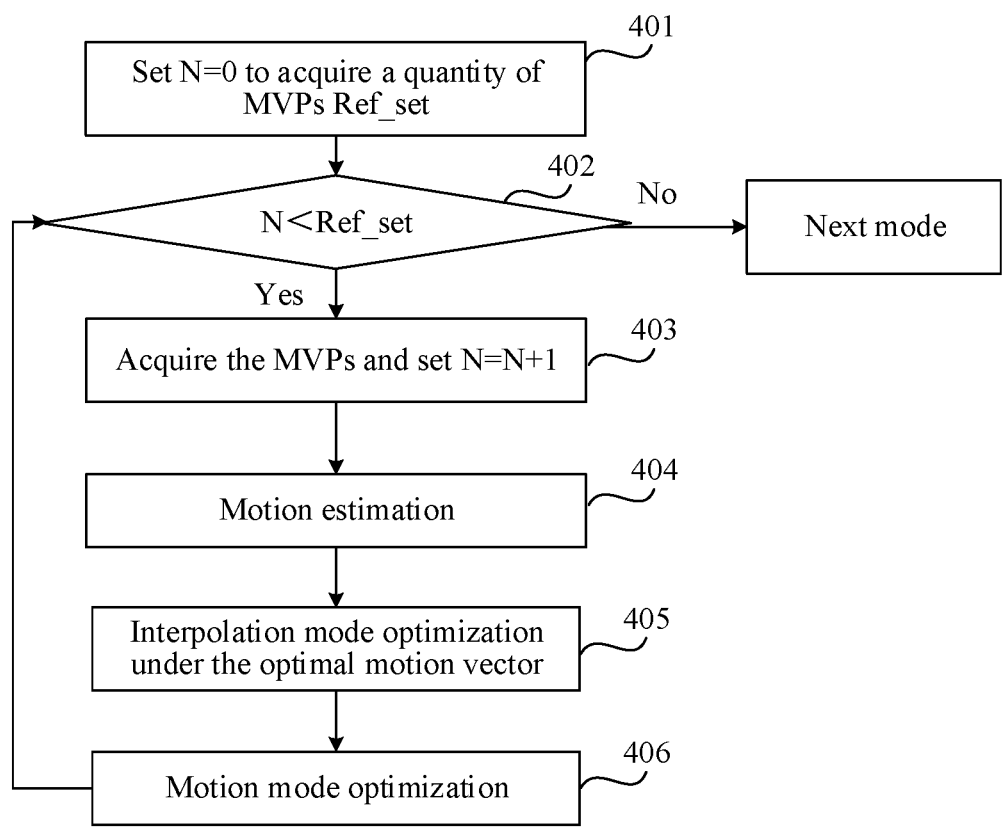
FIG. 4 is a schematic diagram of a process of selecting an optimal result in a NEWMV mode according to related technologies.

For example, FIG. 4 shows a schematic diagram of a process of selecting an optimal result in the NEWMV mode according to related technologies. As shown in FIG. 4, the process includes the following steps.

In step 401, set N=0 and acquire a quantity of MVPs.

In an example, an initial value of N is set to 0, and N represents the N-th MVP, so that each MVP can be traversed. For example, a maximum value of N may be 7×3−1=20. In other words, for a CU, there may be a maximum of 21 MVPs in the NEWMV mode.

In step 402, determine whether N is less than the quantity of MVPs.

When N is less than the quantity of MVPs, it indicates that the traversal of MVPs for the current CU in the EWMV mode has not been completed.

In step 403, when N is less than the quantity of MVPs, acquire an MVP and set N=N+1.

Setting N=N+1 means that the next MVP will be traversed after the traversal of the current MVP is complete. When N is greater than or equal to the quantity of MVPs, it indicates that the traversal of all the MVPs for the current CU in the EWMV mode have been completed, and traversal of MVPs in the next prediction mode may be performed for the current CU.

In step 404, motion estimation is performed. For example, motion estimation is performed on the current MVP to obtain an optimal motion vector corresponding to the current MVP.

In step 405, interpolation mode optimization under the optimal motion vector is performed. For example, the optimal interpolation mode corresponding to the optimal motion vector is selected from nine interpolation modes.

In step 406, motion mode optimization is performed. For example, an optimal motion mode corresponding to the optimal motion vector is selected from four motion modes.

In the above process of selecting the optimal result in the NEWMV mode, it is necessary to perform motion estimation, interpolation based on nine modes and calculation based on four motion modes for each MVP, in order to select the optimal motion vector, the optimal interpolation mode and the optimal motion mode corresponding to the optimal MVP, resulting in high great computational complexity and low coding efficiency.

Figure 5:
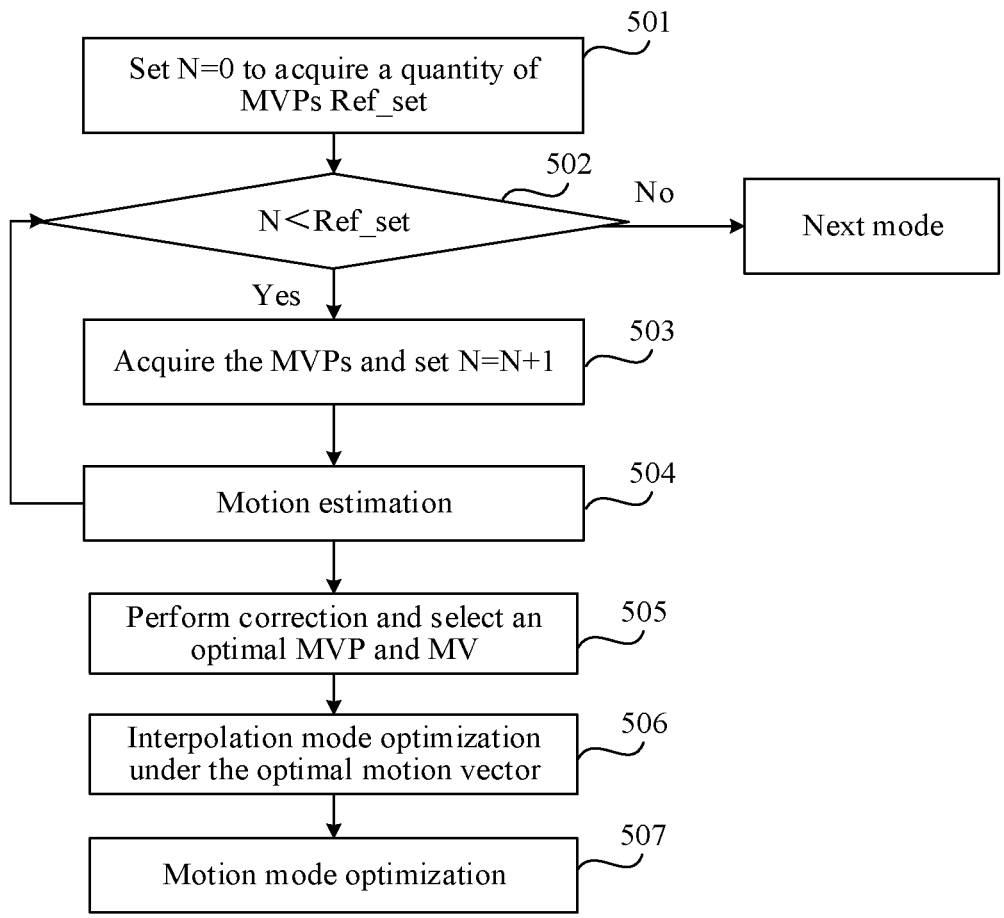
FIG. 5 is a schematic diagram of an overall process of an inter prediction encoding method according to an embodiment of this disclosure.

Embodiments of this disclosure include an inter prediction encoding method, which can improve the encoding efficiency of inter prediction in the NEWMV mode. This method can select an optimal motion vector and MVP combination based on a correction strategy, and then perform interpolation mode optimization and motion mode optimization only for the optimal motion vector and MVP combination. Compared with FIG. 4 above, FIG. 5 is a schematic diagram of an overall process of an inter prediction encoding method according to an embodiment of this disclosure. As shown in FIG. 5, the process may include the following steps.

In step 501, set N=0 and acquire a quantity of MVPs.

In an example, an initial value of N is set to 0, and N represents the N-th MVP, so that each MVP can be traversed. In an embodiment of this disclosure, it is only necessary to traverse the motion vectors corresponding to each MVP.

In step 502, determine whether N is less than the quantity of MVPs.

When N is less than the quantity of MVPs, it indicates that the traversal of MVPs for the current CU in the EWMV mode has not been completed.

In step 503, when N is less than the quantity of MVPs, acquire an MVP and set N=N+1.

Setting N=N+1 means that the next MVP will be traversed after the traversal of the current MVP is complete. When N is greater than or equal to the quantity of MVPs, it indicates that the traversal of all the MVPs for the current CU in the EWMV mode have been completed, and traversal of MVPs in the next prediction mode may be performed for the current CU. Assuming that the quantity of MVPs in the EWMV mode is M, i.e., traversal is performed from the zeroth MVP to the (M−1)th MVP, a total of M MVPs are traversed.

In step 504, motion estimation is performed. For example, motion estimation is performed on the current MVP to obtain an optimal MV corresponding to the current MVP (i.e., the candidate MV hereinafter). After the optimal MV corresponding to each MVP is obtained, step 505 is executed.

In step 505, perform correction and select an optimal MVP and MV combination. For example, the optimal MVP and MV combination is selected based on each MVP and the optimal MV corresponding to each MVP by using the correction strategy. This process will be described in detail below. For details that are not explained in the embodiment of this disclosure, reference can be made to the following embodiments, and the details will not be repeated here.

In step 506, interpolation mode optimization under the optimal motion vector is performed. For example, interpolation mode optimization is performed for the optimal MVP and MV combination to obtain an optimal interpolation mode.

In step 507, motion mode optimization is performed. For example, motion mode optimization is performed for the optimal MVP and MV combination to obtain an optimal motion mode.

According to FIG. 5, in the inter prediction encoding method according to the embodiment of this disclosure, after motion estimation is performed, the process is cyclically performed, then correction needs to be performed, an optimal MVP and MV combination is selected, and finally subsequent interpolation mode optimization and motion mode optimization are performed based on the optimal MVP and MV combination. Compared with related technologies, in the NEWMV mode, in the embodiment of this disclosure, it is not necessary to perform interpolation mode traversal and motion mode traversal for all MVPs and motion vectors, thereby reducing the calculation amount of rate-distortion costs and the computational complexity, and further improving the encoding efficiency in the NEWMV mode.

Based on the above description, the inter prediction encoding method according to the embodiments of this disclosure will be described in detail below.

Figure 6:
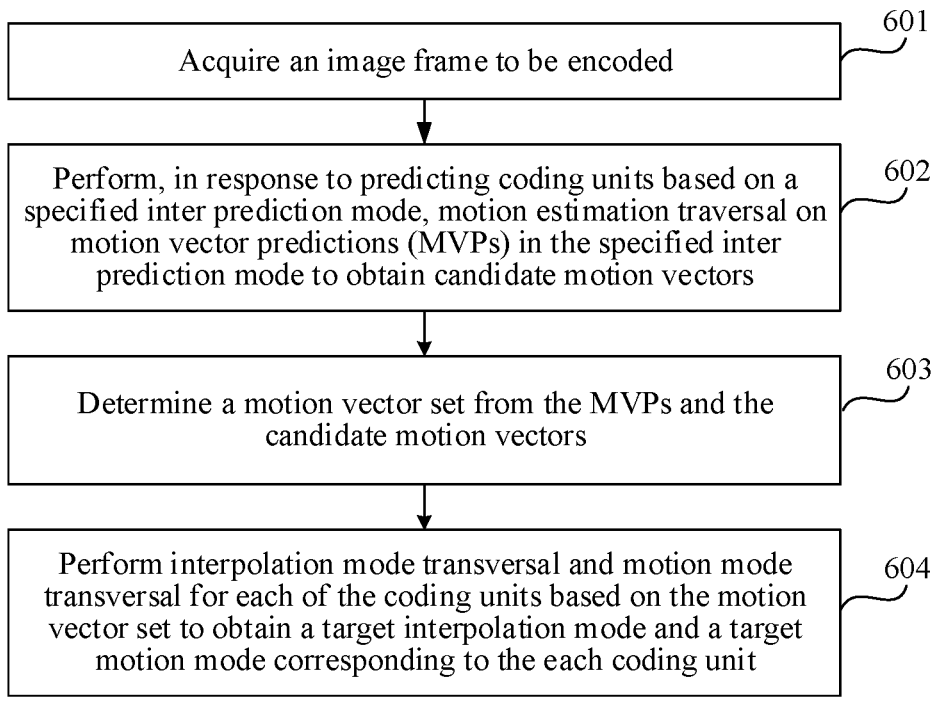
FIG. 6 is a flowchart of an inter prediction encoding method according to an embodiment of this disclosure.

FIG. 6 is a flowchart of an inter prediction encoding method according to an embodiment of this disclosure. This embodiment is described using an example where the method is applied in an encoder. As shown in FIG. 6, the method may include the following steps.

In step 601, acquire an image frame to be encoded.

In this embodiment, the image frame is divided into coding units, each of the coding units corresponds to at least two prediction modes, and the at least two prediction modes include a specified inter prediction mode.

In some embodiments, the image frame to be encoded is a non-key frame, i.e., a P frame or a B frame. During acquiring the image frame to be encoded, a to-be-encoded video stream corresponding to the image frame to be encoded is first acquired, and each image frame in the to-be-encoded video stream is sequentially acquired, to determine the current image frame to be encoded.

In some embodiments, each coding unit corresponds to an intra prediction mode and an inter prediction mode. The inter prediction mode includes a NEWMV mode. For example, the NEWMV mode is the specified inter prediction mode provided in the embodiments of this disclosure. Because the NEWMV mode depends on the derivation of MVPs, it is necessary to determine an optimal MVP from at least two (usually three) MVPs in the NEWMV mode.

The specified inter prediction mode in the embodiments of this disclosure may be the NEWMV mode, or may be a combined mode including the NEWMV mode, which is not limited in the embodiments of this disclosure.

In step 602, perform, in response to predicting coding units based on a specified inter prediction mode, motion estimation traversal on motion vector predictions (MVPs) in the specified inter prediction mode to obtain candidate motion vectors.

In some embodiments, during the motion estimation traversal on the MVPs, a quantity of MVPs is obtained first; for an i-th MVP, in response to i being not greater than the quantity of the MVPs, motion estimation is performed on the i-th MVP to obtain an i-th candidate motion vector, i being an integer; and n candidate motion vectors are obtained for n MVPs, the i-th MVP being corresponding to the i-th candidate motion vector, and n being the quantity of the MVPs. The i-th candidate motion vector may refer to an optimal motion vector corresponding to the i-th MVP in motion estimation. The specific motion estimation method will be described in detail below, and will not be repeated here.

For example, if the quantity of MVPs is 3, motion estimation is performed on the zeroth MVP, and similarly, motion estimation is performed on the first MVP and the second MVP, to realize the motion estimation traversal for the three MVPs.

In some embodiments, after the candidate motion vectors corresponding to the N MVPs are obtained, the candidate motion vectors are stored. In an example, the candidate motion vectors are stored; or, the candidate motion vectors and distortions of the candidate motion vectors are stored.

In this embodiment, taking the storage of the candidate motion vectors and the distortions of the candidate motion vectors as an example, the storage may be performed in at least one of the following manners.

First, a first array and a second array are constructed, where the first array and the second array are respectively used to store the candidate motion vector and the distortion of the candidate motion vector.

Second, a database is constructed, and the candidate motion vector and the distortion of the candidate motion vector are stored in the form of a key-value pair.

In embodiments of this disclosure, the construction of the first array and the second array to store the candidate motion vectors and the distortions of the candidate motion vectors is used as an example for description. The first array is used to store the distortion of the candidate motion vector corresponding to the MVP, and the second array is used to store the candidate motion vector corresponding to the MVP. After motion estimation is performed on the i-th MVP to obtain the i-th candidate motion vector, the distortion corresponding to the i-th candidate motion vector is stored in the first array, and the i-th candidate motion vector is stored in the second array.

In some embodiments, the candidate motion vectors include the optimal motion vectors obtained by performing motion estimation on the MVPs.

For example, when the motion estimation traversal is performed on the MVPs in the specified inter prediction mode, the following processes may be mainly included.

1. Acquire a quantity of MVPs.

Figure 7:
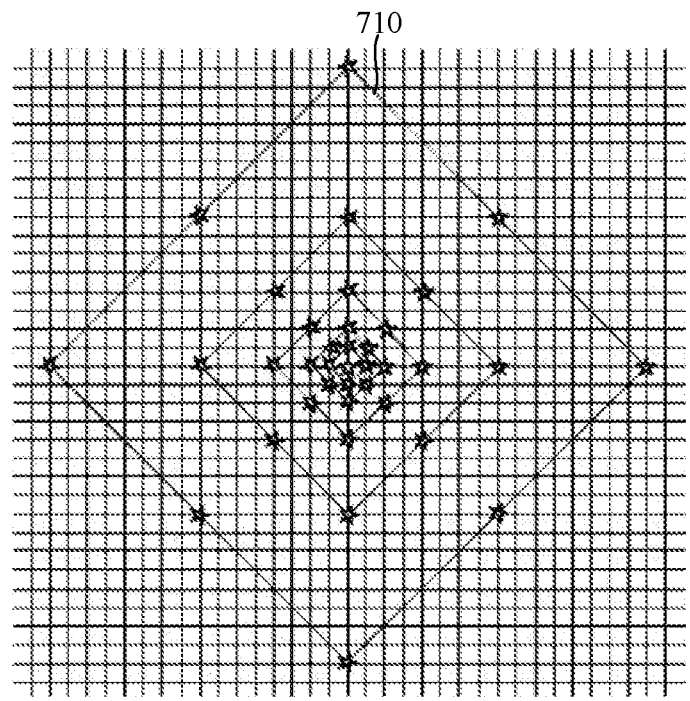
FIG. 7 is a schematic diagram of a TZ search template based on the embodiment shown in FIG. 6.

In some embodiments, the quantity of MVPs in the NEWMV mode is 3, that is, the zeroth to second MVPs shown in FIG. 7 above.

2. Set arrays for storing data corresponding to each MVP.

The set arrays include a first array and a second array, respectively as follows.

First array: dist_bestmv_list[i], for storing the distortion of the optimal motion vector corresponding to each MVP.

Second array: me_bestmv_list[i], for storing the optimal motion vector corresponding to each MVP. Herein, i is used for representing the i-th MVP, and the value of i is 0, 1, or 2.

3. Perform motion estimation on each MVP in sequence.

Manners of motion estimation may include integer-pixel motion estimation and sub-pixel motion estimation. Integer pixel motion estimation may include a TZ search method (to be introduced below), NStep search method, diamond search method (to be introduced below), hexagon search method, etc. Sub-pixel motion estimation may include diamond search, full search, etc.

4. After the optimal motion vector corresponding to each MVP is obtained, the distortion and optimal motion vector corresponding to the current MVP index can be obtained. The distortion and optimal motion vector corresponding to the current MVP index are recorded in the arrays respectively.

For example, mvp_index is used to represent the current MVP index, and the value of mvp_index is [0, 2], then dist_bestmv_list[mvp_index]=dist; me_bestmv_list[mvp_index]=bestmv.

Herein, dist represents the distortion and bestmv represents the optimal motion vector. In an example, the distortion corresponding to the MVP index is stored under the MVP index of the first array, and the optimal motion vector under the MVP index is stored under the MVP index of the second array. For example, the distortion corresponding to the zeroth MVP is stored under the index of the zeroth MVP in the first array, which is dist_bestmv_list[0], and the optimal motion vector corresponding to the zeroth MVP is stored under the index of the zeroth MVP in the second array, which is me_bestmv_list [0].

In step 603, determine a motion vector set from the MVPs and the candidate motion vectors.

The motion vector set includes a target MVP determined from the MVPs and a target motion vector determined from the candidate motion vectors.

In some embodiments, the target MVP is the optimal MVP and the target motion vector is the optimal motion vector.

In some embodiments, the target MVP and the target motion vector are a corresponding motion vector set, i.e., when the target MVP is the i-th MVP, the target motion vector is the i-th motion vector. In this case, the motion vector set can be determined directly according to the rate-distortion cost corresponding to each candidate motion vector set. For example, a first rate-distortion cost of the zeroth MVP and the zeroth motion vector, a second rate-distortion cost of the first MVP and the first motion vector, and a third rate-distortion cost of the second MVP and the second motion vector are determined. According to the first rate-distortion cost, the second rate-distortion cost and the third rate-distortion cost, the motion vector set with the minimum rate-distortion cost is determined. For example, when the first rate-distortion cost is the smallest, the zeroth MVP and the zeroth motion vector corresponding to the first rate-distortion cost are determined as the motion vector set.

In the above embodiments, the determination of the motion vector set with the smallest rate-distortion cost is used as an example for description. In some embodiments, two motion vector sets with the smallest rate-distortion cost may be determined, and subsequent interpolation traversal and motion mode traversal are respectively performed on the MVPs and motion vectors corresponding to the two motion vector sets with the smallest rate-distortion cost. This is not limited in the embodiments of this disclosure. In an example, the quantity of motion vector sets can be determined by an external interface.

In some other embodiments, the target MVP and the target motion vector are a motion vector set obtained through recombination, i.e., when the target MVP is the i-th MVP, the target motion vector may be the i-th motion vector or a motion vector determined by other MVPs. In the embodiments of this disclosure, the target MVP and the target motion vector being a motion vector set obtained through recombination is used as an example for description.

For example, each MVP and each candidate motion vector are recombined in sequence, and a motion vector set is determined from the obtained combinations. The quantity of combinations obtained by recombining each MVP and each candidate motion vector is the product of the quantity of MVPs and the quantity of candidate motion vectors.

The above recombination manner of MVPs and motion vectors is only an example, and the specific recombination mode of MVPs and motion vectors is not limited in the embodiments of this disclosure.

Among the MVPs and the corresponding candidate motion vectors obtained in the above step 602, there may be a local optimal value for the matching between the MVPs and the candidate motion vectors. Therefore, in the embodiments of this disclosure, the motion vector set can be determined by correction (i.e., recombination) to eliminate or reduce the influence of the local optimal value, to improve the accuracy of obtaining the target MVP and the target motion vector and improve the quality of the motion vector set, thereby improving the encoding quality in the specified inter prediction mode.

Correction may be made by recombining all MVPs and all candidate motion vectors.

For example, motion estimation is performed on the zeroth MVP to obtain a zeroth candidate motion vector (i.e., the optimal motion vector of the zeroth MVP); motion estimation is performed on the first MVP to obtain a first candidate motion vector (i.e., the optimal motion vector of the first MVP); motion estimation is performed on the second MVP to obtain a second candidate motion vector (i.e., the optimal motion vector of the second MVP). Then the three MVPs and three candidate motion vectors are recombined in sequence, to obtain a combination of the zeroth MVP and the zeroth candidate motion vector, a combination of the zeroth MVP and the first candidate motion vector, a combination of the zeroth MVP and the second candidate motion vector, a combination of the first MVP and the zeroth candidate motion vector, a combination of the first MVP and the first candidate motion vector, a combination of the first MVP and the second candidate motion vector, a combination of the second MVP and the zeroth candidate motion vector, a combination of the second MVP and the first candidate motion vector, a combination of the second MVP and the second candidate motion vector. The motion vector set, for example, the combination with the smallest rate-distortion cost, is determined from these combinations.

In some embodiments, the combination with the smallest rate-distortion cost is determined from these combinations as the motion vector set; or, from these combinations, a plurality of combinations with the smallest rate-distortion cost are determined as motion vector sets, and interpolation mode traversal and motion mode traversal are respectively performed according to the target MVPs and the target motion vectors respectively corresponding to the plurality of motion vector sets. The quantity of motion vector sets can be determined by an external interface.

In step 604, perform interpolation mode transversal and motion mode transversal for each of the coding units based on the motion vector set to obtain a target interpolation mode and a target motion mode corresponding to the each coding unit.

In some embodiments, after the motion vector set is determined, interpolation mode optimization and motion mode optimization may be performed according to the target MVP (for example, the optimal MVP) and the target motion vector (for example, the optimal motion vector) in the motion vector set.

To sum up, according to the inter prediction encoding method provided in the embodiment of this disclosure, in a scenario of encoding an image frame using a specified inter prediction mode (for example, NEWMV mode), a combination including a target MVP and a target motion vector (for example, an optimal combination) is determined first, and then an optimal interpolation mode and an optimal motion mode are determined for this combination, i.e., it is not necessary to perform interpolation mode traversal and motion mode traversal for all MVPs and motion vectors, thereby reducing the calculation amount of rate-distortion costs and the computational complexity, and further improving the encoding efficiency in the specified inter prediction mode.

In addition, the motion vector set is determined by correction (i.e., recombination) to eliminate or reduce the influence of the local optimal value between MVPs and candidate motion vectors, to improve the accuracy of obtaining the target MVP and the target motion vector and improve the quality of the motion vector set, thereby improving the encoding quality in the specified inter prediction mode.

In some embodiments, the above motion estimation methods are introduced by using the TZ search method and diamond search method as representatives.

The implementation of the TZ search method includes the following processes.

(1) Determine a search starting point.

The current MVP is used as a search starting point. Rate-distortion costs of motion vectors corresponding to the current MVP and a position (0, 0) are compared, and the motion vector with the smaller rate-distortion cost is used as a final search starting point.

(2) Search within a search window range based a step size of 1.

For example, refer to FIG. 7, which shows a schematic diagram of a TZ search template according to an embodiment of this disclosure. As shown in FIG. 7, the TZ search method includes a diamond template 710, and a search is performed within the search window range of the diamond template 710. The step size is increased by an integer power of 2, and the point with the smallest rate-distortion cost is selected as a search result (the optimal motion vector is determined based on the search result).

Figure 8:
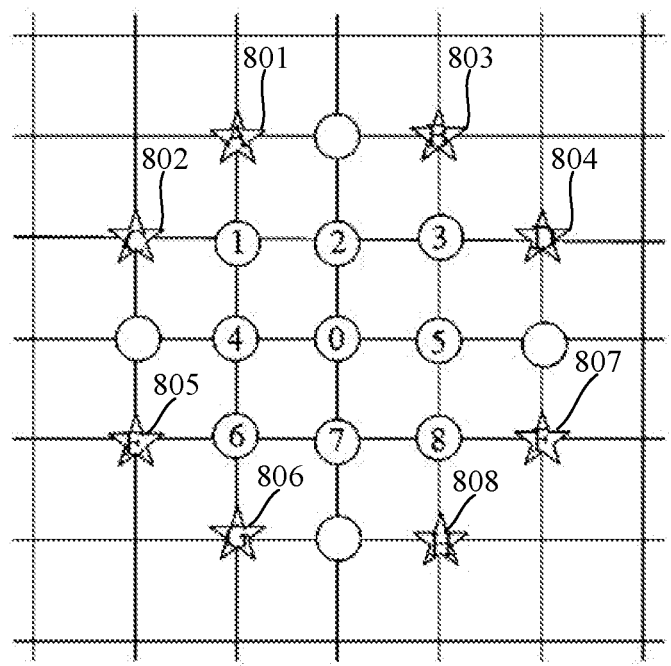
FIG. 8 is a schematic diagram of additional points based on the search provided in FIG. 6.

(3) If the step size corresponding to the point with the smallest rate-distortion cost is 1, start a 2-point search. For example, FIG. 8 shows a schematic diagram of a 2-point search according to an embodiment of this disclosure. As shown in FIG. 8, point 801 and point 802 are added at point 1, point 803 and point 804 are added at point 3, point 805 and point 806 are added at point 6, and point 807 and point 808 are added at point 8. For other positions, such as point 2, point 4, point 5 and point 7, position points above, below, on the left of, and on right of these positions have been calculated, so no point needs to be added.

Figure 9:
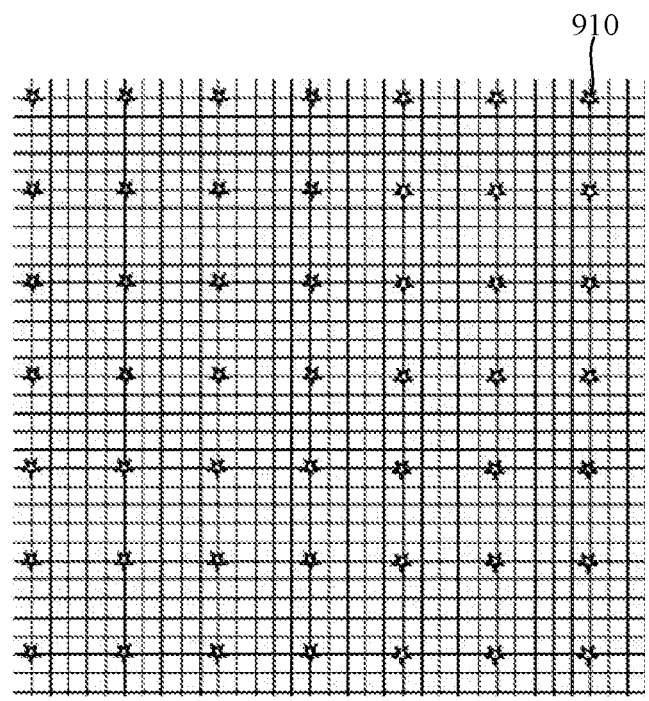
FIG. 9 is a partial schematic diagram of searching for position points in a raster scanning manner based on the embodiment shown in FIG. 6.

(4) If the step size corresponding to the point with the smallest rate-distortion cost obtained in step (3) is greater than 5, all points on every other 5 rows and 5 columns are scanned by raster scanning. For example, refer to FIG. 9, which shows a partial schematic diagram of each searching for position points in a raster scanning manner. As shown in FIG. 9, marked points 910 on every other 5 rows and 5 columns are scanned to obtain the search result.

The implementation of the diamond search method includes the following processes.

The diamond search method has two different matching templates: large diamond and small diamond. The large diamond matching template has 9 search points and the small diamond matching template has 5 search points. First, the large diamond matching template with a large step size is used for coarse search, and then the small diamond matching template is used for fine search. The search steps can be as follows.

I. By taking a central point of the search window as the center, rate-distortion costs of the central point and eight points around the central point (a total of nine points) are calculated according to the large diamond matching template, and compared to obtain the point with the smallest rate-distortion cost.

II. If the central point of the search window is the point with the smallest rate-distortion cost, step III is performed to apply the small diamond search template; otherwise, the process goes back to step I.

III. By using the small diamond matching template having only five search points, rate-distortion costs of the five points are calculated, and the point with the smallest rate-distortion cost is determined as an optimal matching point, i.e., the optimal motion vector.

Figure 10:
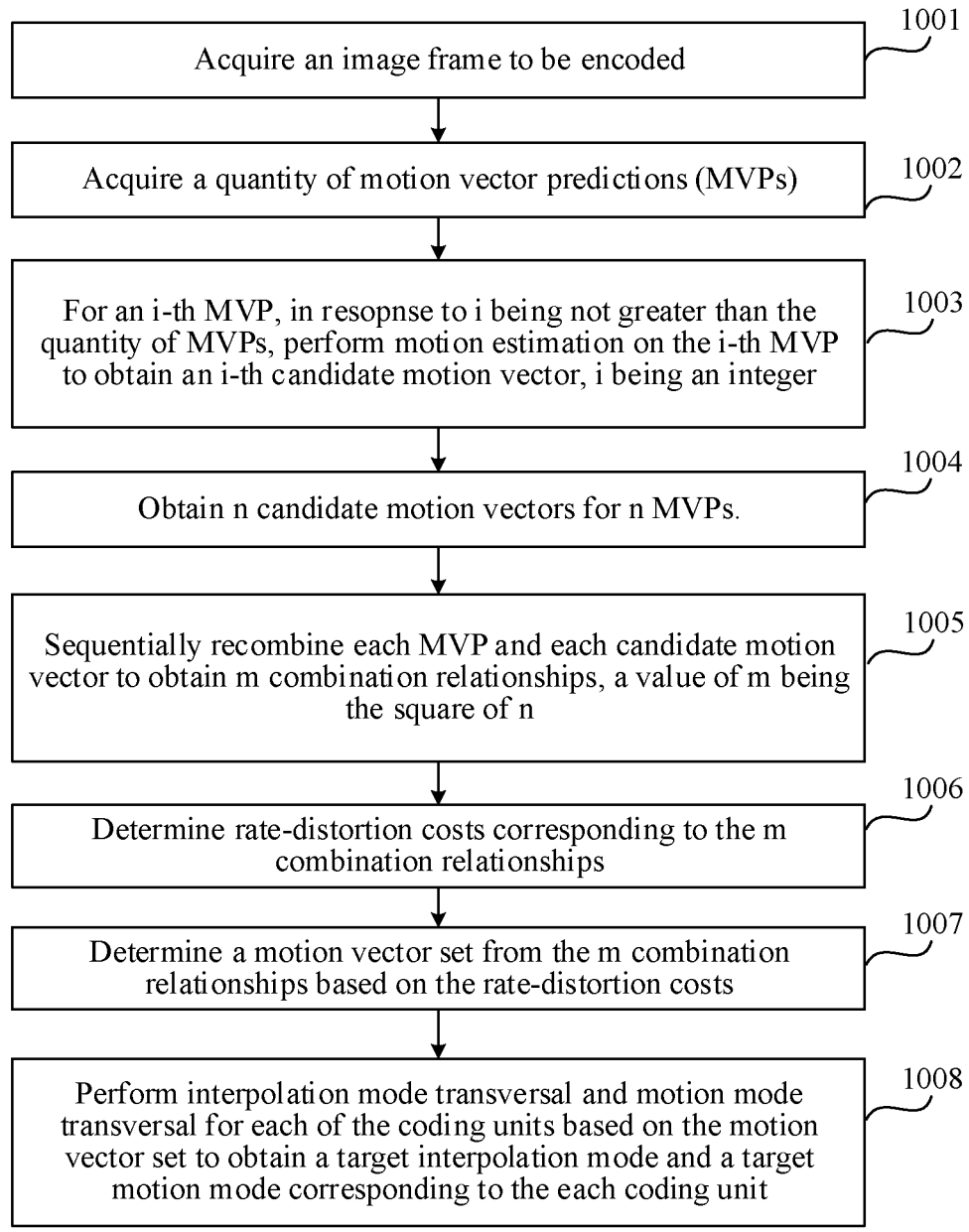
FIG. 10 is a flowchart of an inter prediction encoding method according to another embodiment of this disclosure.

In some embodiments, the above-mentioned MVP and motion vector correction method is realized by recombining MVP and candidate motion vectors. FIG. 10 is a flowchart of an inter prediction encoding method according to another embodiment of this disclosure. This embodiment is described using an example where the method is applied in an encoder. As shown in FIG. 10, the method may include the following steps.

In step 1001, acquire an image frame to be encoded.

The image frame is divided into coding units, each of the coding units corresponds to at least two prediction modes, and the at least two prediction modes include a specified inter prediction mode.

In step 1002, acquire a quantity of motion vector predictions (MVPs).

In step 1003, for an i-th MVP, in response to i being not greater than the quantity of MVPs, perform motion estimation on the i-th MVP to obtain an i-th candidate motion vector, i being an integer.

For example, assuming that the quantity of MVPs is 3, motion estimation is performed for the zeroth MVP because the zeroth MVP is not greater than the quantity of MVPs. Similarly, motion estimation is performed for the first MVP and the second MVP.

In step 1004, obtain n candidate motion vectors for n MVPs.

The i-th MVP corresponds to the i-th candidate motion vector, n being the quantity of MVPs.

For example, motion estimation is performed on the zeroth MVP to obtain a zeroth candidate motion vector (i.e., the optimal motion vector of the zeroth MVP); motion estimation is performed on the first MVP to obtain a first candidate motion vector (i.e., the optimal motion vector of the first MVP); and motion estimation is performed on the second MVP to obtain a second candidate motion vector (i.e., the optimal motion vector of the second MVP).

In step 1005, sequentially recombine each MVP and each candidate motion vector to obtain m combination relationships, a value of m being the square of n.

For example, the above MVPs and candidate motion vectors are recombined to obtain a combination of the zeroth MVP and the zeroth candidate motion vector, a combination of the zeroth MVP and the first candidate motion vector, a combination of the zeroth MVP and the second candidate motion vector, a combination of the first MVP and the zeroth candidate motion vector, a combination of the first MVP and the first candidate motion vector, a combination of the first MVP and the second candidate motion vector, a combination of the second MVP and the zeroth candidate motion vector, a combination of the second MVP and the first candidate motion vector, a combination of the second MVP and the second candidate motion vector. The motion vector set, for example, the combination with the smallest rate-distortion cost, is determined from these combinations.

In step 1006, determine rate-distortion costs corresponding to the m combination relationships.

In some embodiments, the rate-distortion cost is used to represent a pixel error status under a combination relationship. In some embodiments, the rate-distortion cost is used to represent a pixel coding cost under the combination relationship, and the rate-distortion cost is determined by the quantity of code word bits occupied by distortion and coding under the current combination relationship.

For example, the rate-distortion costs of MVPs and candidate motion vectors after recombination are calculated based on the following formula 1.

$$cost_{ij} = \sum_{i}^{m}\sum_{j}^{m} \text{dist\_bestmv\_list}[j] + mvcost(\text{me\_bestmv\_list}[j] - mvp[i])$$

where i is used to indicate the i-th MVP and j is used to indicate the j-th candidate motion vector. Then m is used to represent the maximum value of the index of the MVP or candidate motion vector, to represent the quantity of MVPs and candidate motion vectors. In some embodiments, the value of m is 0 to a value obtained by subtracting 1 from the quantity of MVPs or candidate motion vectors. mvp[i] represents the i-th MVP, and mvcost(me_beatmv_list[j]-mvp[i]) represents the rate-distortion cost corresponding to the difference between the j-th candidate motion vector and the i-th MVP.

For example, if the value of m is [0, 2], i.e., there are three MVPs, the rate-distortion costs corresponding to nine combinations may be obtained, which are expressed by the following formulas respectively.

$\cos t_{00}=\text{dist\_bestmv\_list}[0]+mvcost(\text{me\_bestmv\_list}[0]-mvp[0])$ $\cos t_{01}=\text{dist\_bestmv\_list}[1]+mvcost(\text{me\_bestmv\_list}[1]-mvp[0])$ $\cos t_{02}=\text{dist\_bestmv\_list}[2]+mvcost(\text{me\_bestmv\_list}[2]-mvp[0])$ $\cos t_{10}=\text{dist\_bestmv\_list}[0]+mvcost(\text{me\_bestmv\_list}[0]-mvp[1])$ $\cos t_{11}=\text{dist\_bestmv\_list}[1]+mvcost(\text{me\_bestmv\_list}[1]-mvp[1])$ $\cos t_{12}=\text{dist\_bestmv\_list}[2]+mvcost(\text{me\_bestmv\_list}[2]-mvp[1])$ $\cos t_{20}=\text{dist\_bestmv\_list}[0]+mvcost(\text{me\_bestmv\_list}[0]-mvp[2])$ $\cos t_{21}=\text{dist\_bestmv\_list}[1]+mvcost(\text{me\_bestmv\_list}[1]-mvp[2])$ $\cos t_{22}=\text{dist\_bestmv\_list}[2]+mvcost(\text{me\_bestmv\_list}[2]-mvp[2])$ $cost_{00}$ represents the combination relationship between the zeroth MVP and the zeroth candidate motion vector; $cost_{01}$ represents the combination relationship between the zeroth MVP and the first candidate motion vector; $cost_{02}$ represents the combination relationship between the zeroth MVP and the second candidate motion vector; and so on.

In step 1007, determine a motion vector set from the m combination relationships based on the rate-distortion costs.

In some embodiments, the target combination relationship with the smallest rate-distortion cost is determined from the m combination relationships, and the motion vector set including the target MVP and the target motion vector in the target combination relationship is determined.

For example, take the above nine combination relationships as an example, if $cost_{20}$ is the smallest, the optimal mvp index is 2 and the optimal motion vector index is 0, that is, the second MVP and the zeroth candidate motion vector constitute a motion vector set, where the second MVP is the target MVP and the zeroth candidate motion vector is the target motion vector.

In step 1008, perform interpolation mode transversal and motion mode transversal for each of the coding units based on the motion vector set to obtain a target interpolation mode and a target motion mode corresponding to the each coding unit.

In some embodiments, after the motion vector set is determined, interpolation mode optimization and motion mode optimization are performed according to the target MVP (for example, the optimal MVP) and the target motion vector (for example, the optimal motion vector) in the motion vector set.

To sum up, according to the inter prediction encoding method provided in the embodiment of this disclosure, in a scenario of encoding an image frame using a specified inter prediction mode (for example, NEWMV mode), a combination including a target MVP and a target motion vector (for example, an optimal combination) is determined first, and then an optimal interpolation mode and an optimal motion mode are determined for this combination, i.e., it is not necessary to perform interpolation mode traversal and motion mode traversal for all MVPs and motion vectors, thereby reducing the calculation amount of rate-distortion costs and the computational complexity, and further improving the encoding efficiency in the specified inter prediction mode.

In addition, according to the method provided in this embodiment, the MVPs and the optimal motion vectors corresponding to the MVPs are corrected by recombining the MVPs and the candidate motion vectors, to avoid the situation where there is a local optimal value between the MVPs and the optimal motion vectors corresponding to the MVPs, and improve the accuracy of determining the target MVP and the target motion vector, thereby further improving the encoding quality.

In addition, the method provided in this embodiment can reduce ⅔ of the computation amount of interpolation traversal and motion mode calculation in the NEWMV mode.

Figure 11:
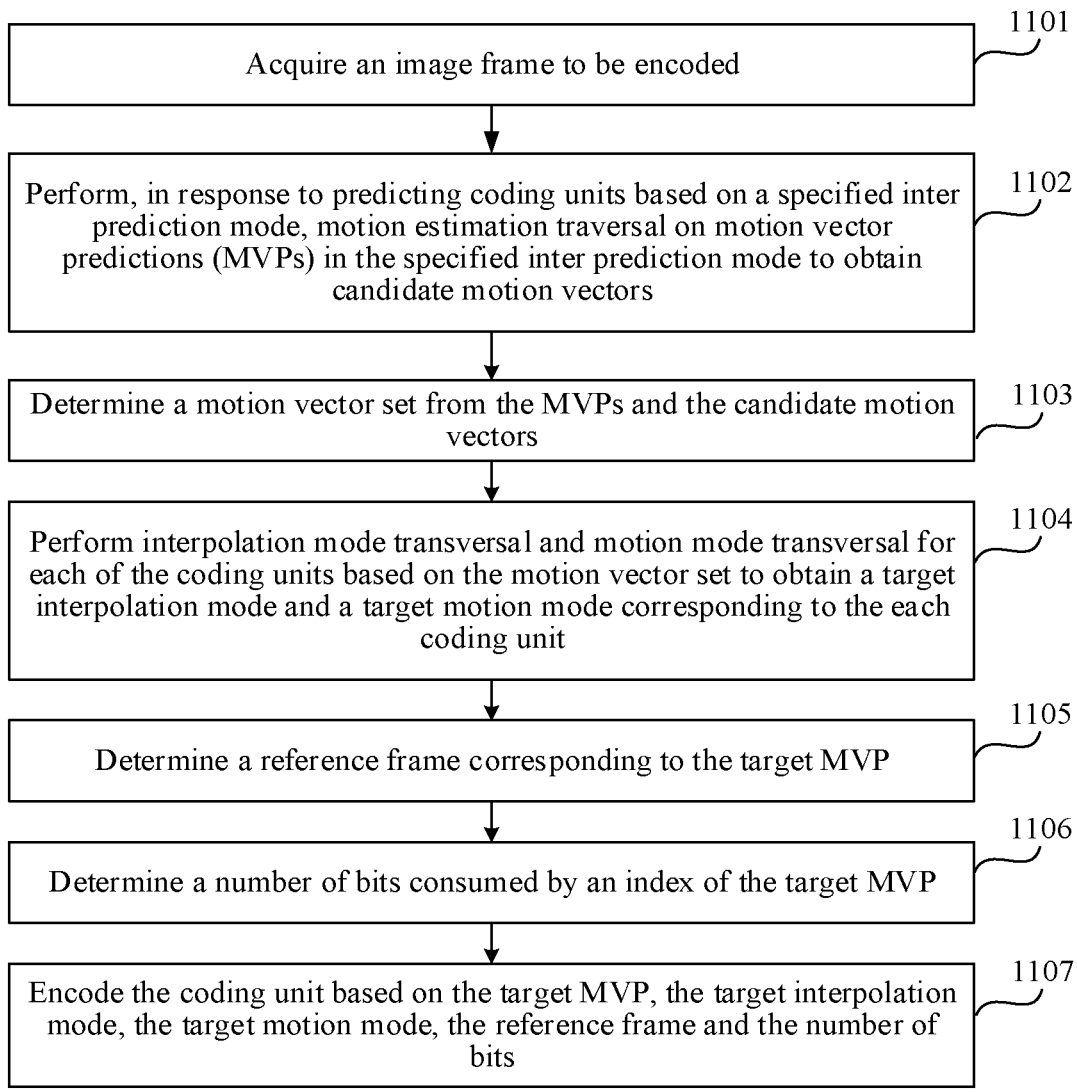
FIG. 11 is a flowchart of an inter prediction encoding method according to another embodiment of this disclosure.

In some embodiments, after the motion vector set is determined, the reference frame, the number of bits consumed by the index and so on also need to be determined. FIG. 11 is a flowchart of an inter prediction encoding method according to another embodiment of this disclosure. This embodiment is described using an example where the method is applied in an encoder. As shown in FIG. 11, the method may include the following steps.

In step 1101, acquire an image frame to be encoded.

The image frame is divided into coding units, each of the coding units corresponds to at least two prediction modes, and the at least two prediction modes include a specified inter prediction mode.

In step 1102, perform, in response to predicting coding units based on a specified inter prediction mode, motion estimation traversal on motion vector predictions (MVPs) in the specified inter prediction mode to obtain candidate motion vectors.

In some embodiments, during the motion estimation traversal on the MVPs, a quantity of MVPs is obtained first; for an i-th MVP, in response to i being not greater than the quantity of the MVPs, motion estimation is performed on the i-th MVP to obtain an i-th candidate motion vector, i being an integer; and n candidate motion vectors are obtained for n MVPs, the i-th MVP being corresponding to the i-th candidate motion vector, and n being the quantity of the MVPs.

In step 1103, determine a motion vector set from the MVPs and the candidate motion vectors.

The motion vector set includes a target MVP determined from the MVPs and a target motion vector determined from the candidate motion vectors.

In some embodiments, the target MVP is the optimal MVP and the target motion vector is the optimal motion vector.

Among the MVPs and the corresponding candidate motion vectors obtained in the above step 1102, there may be a local optimal value for the matching between the MVPs and the candidate motion vectors. Therefore, in the embodiments of this disclosure, the MVPs and the candidate motion vectors can be corrected by recombination to obtain the target MVP and the target motion vector.

In step 1104, perform interpolation mode transversal and motion mode transversal for each of the coding units based on the motion vector set to obtain a target interpolation mode and a target motion mode corresponding to the each coding unit.

In some embodiments, after the motion vector set is determined, interpolation mode optimization and motion mode optimization are performed according to the target MVP (for example, the optimal MVP) and the target motion vector (for example, the optimal motion vector) in the motion vector set.

In some embodiments, the interpolation mode optimization and motion mode optimization are introduced.

The interpolation mode optimization includes the following processes.

Interpolation is a process to increase the sampling rate. The reason for interpolation is that if the optimal motion vector contains sub-pixels, a predicted pixel cannot be directly obtained, so it is necessary to first obtain a reference pixel corresponding to the integer pixel position of the optimal motion vector, and then perform interpolation according to sub-pixel coordinates, to finally obtain the predicted pixel.

In the process of interpolation calculation, horizontal interpolation is performed first, and then vertical interpolation is performed. In AV1, three interpolation methods are designed for sub-pixels: REG (interpolation based on regular expressions), SMOOTH (smooth interpolation) and SHARP. All the filter kernels have 8 taps, and the difference between the three interpolation methods mainly lies in the coefficients of the filtering kernels.

The horizontal and vertical interpolations can be arbitrarily combined, to obtain nine interpolation modes, namely, REG_REG, REG_SMOOTH, REG_SHARP, SMOOTH_REG, SMOOTH_SMOOTH, SMOOTH_SHARP, SHARP_REG. SHARP_SMOOTH and SHARP_SHARP.

The nine interpolation modes are traversed, rate-distortion costs of the interpolation modes are estimated, and the interpolation mode with the smallest rate-distortion cost is the optimal interpolation mode.

The implementation of the motion mode optimization includes the following processes.

Motion modes mainly include the following four types: IMPLE, OBMC, WARPED and SIMPLE(inter_intra).

The optimal motion mode is written into a bit stream to inform the decoder of a motion mode to be used to recover reconstruction data during decoding. SIMPLE(inter_intra) and SIMPLE are both SIMPLE modes, but they are quite different. During decoding, the SIMPLE mode and the SIMPLE(inter_intra) mode may be distinguished based on reference frame information in syntax. In this way, as the same tag is used, one bit can be saved.

Rate-distortion cost of all the four motion modes need to be estimated, i.e., all the four motion modes need to be subjected to the entire reconstruction process including transformation, quantization, inverse quantization and inverse transformation. For the four motion modes, different methods are used to obtain the predicted pixel.

First step: Obtain the predicted pixel.

For the SIMPLE mode, the predicted pixel is a predicted value obtained after interpolation.

For the OBMC mode, the predicted pixel obtained after interpolation is reprocessed. According to MVs of adjacent blocks, predicted pixels of the adjacent blocks are obtained. Then the predicted pixels of the adjacent blocks are fused with the predicted value of the current block obtained after interpolation according to a certain rule to obtain a new predicted value.

For the WARPED mode, with reference to three available positions on the left, the top and the upper right corner, an affine transformation MV is constructed, then a small-range motion search is performed, and finally interpolation is performed to obtain the predicted pixel.

For the SIMPLE(inter_intra) mode, the predicted pixel obtained after interpolation is reprocessed. First, intra prediction of DC, V, H and Smooth modes is performed to obtain an optimal intra predicted pixel, and then the intra predicted and inter predicted pixels are fused to obtain a new predicted value.

Second step: Complete rate-distortion calculation.

First, a residual pixel is obtained according to an input pixel and a predicted pixel.

Then, the number of bits other than the residual coefficient is acquired in a certain motion mode.

The acquisition of the number of bits is related to the context of entropy coding. The number of bits "rate" in the rate-distortion cost formula contains a lot of information, e.g., a number of bits consumed by the reference frame, a number of bits consumed by the MVP index, a number of bits consumed by the MVD, a number of bits consumed by the interpolation mode, a number of bits consumed by the motion mode, a number of bits consumed by the residual, and so on. Herein, the number of bits is the total number of bits consumed by a certain motion mode except transformation. The number of bits varies with different motion modes.

Then, calculation is performed on residual data by SSE.

It is necessary to transform, quantize, inverse quantize and inverse transform the residual data to obtain a reconstructed pixel. During the transformation, the number of bits in the above step 2, a number of bits consumed by the transformation type, a number of bits consumed by the transformation unit division type, and a number of bits consumed by the residual coefficient, are needed to evaluate an optimal transformation type and optimal TU partitioning type of the current prediction block. Then a distortion and a number of bits corresponding to the optimal transformation type and optimal TU partitioning type are obtained, which are defined as dist and rate respectively.

Finally, the rate-distortion cost rdcost is obtained, and the motion mode corresponding to the smallest rate-distortion cost is the optimal motion mode.

Herein, rdcost=dist+rate×$\lambda$, where $\lambda$ is a preset constant.

The calculation of the distortion is explained above by taking SSE as an example. In the embodiments of this disclosure, the calculation may also be realized by SATD, SAD, etc., which is not limited in the embodiments of this disclosure.

In step 1105, determine a reference frame corresponding to the target MVP.

In some embodiments, a reference frame indexing mode corresponding to the target MVP is determined, and the reference frame is obtained based on the reference frame indexing mode and the index of the target MVP. Refer to Table 1 above for the reference frame indexing mode.

In step 1106, determine a number of bits consumed by the index of the target MVP.

In an example, the difference between the target motion vector and the target MVP is determined as the number of bits consumed by the index of the target MVP. That is, mvd=best_mv−best_mvp, where best_mv represents the optimal motion vector (i.e., the target motion vector in the embodiments of this disclosure) and best_mvp represents the optimal MVP (i.e., the target MVP in the embodiments of this disclosure).

In step 1107, encode the coding unit based on the target MVP, the target interpolation mode, the target motion mode, the reference frame and the number of bits.

To sum up, according to the inter prediction encoding method provided in the embodiment of this disclosure, in a scenario of encoding an image frame using a specified inter prediction mode (for example, NEWMV mode), a combination including a target MVP and a target motion vector (for example, an optimal combination) is determined first, and then an optimal interpolation mode and an optimal motion mode are determined for this combination, i.e., it is not necessary to perform interpolation mode traversal and motion mode traversal for all MVPs and motion vectors, thereby reducing the calculation amount of rate-distortion costs and the computational complexity, and further improving the encoding efficiency in the specified inter prediction mode.

In addition, according to the method provided in this embodiment, the target MVP and the corresponding target motion vector are selected in advance through MVP correction, and then interpolation mode traversal and motion mode traversal are performed. In an example, this can save up to ⅔ of the calculation amount of interpolation mode traversal and motion mode traversal, achieving a high speedup, and providing a basis for the inter prediction framework of the single reference frame NEWMV mode, which is the core part of an AV1 encoder.

Test result: For encoding of 65 frames, the speed is increased by 6%, and a speedup greater than 50:1 is achieved.

In the above embodiments, the application of the inter prediction encoding method to the AV1 compression protocol is taken as an example, and the inter prediction encoding method provided in the embodiments of this disclosure can also be applied to other compression protocols, such as H.266 compression protocol, AVS3 compression protocol, etc.

Figure 12:
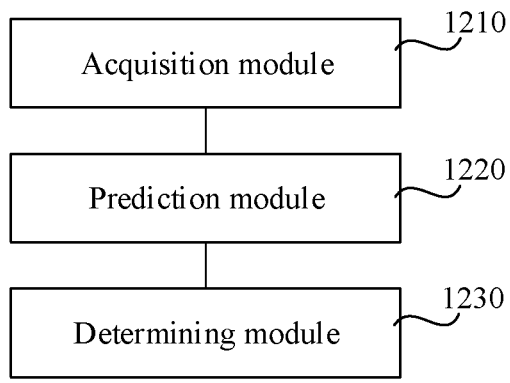
FIG. 12 is a structural block diagram of an inter prediction encoding apparatus according to an embodiment of this disclosure.

FIG. 12 is a structural block diagram of an inter prediction encoding apparatus according to an exemplary embodiment of this disclosure. As shown in FIG. 12, the apparatus includes: an acquisition module 1210, a prediction module 1220, and a determining module 1230. One or more modules, submodules, and/or units of the apparatus can be implemented by processing circuitry, software, or a combination thereof, for example.

The acquisition module 1210 is configured to acquire an image frame to be encoded, the image frame being divided into coding units.

The prediction module 1220 is configured to perform, in response to predicting coding units based on a specified inter prediction mode, motion estimation traversal on motion vector predictions (MVPs) in the specified inter prediction mode to obtain candidate motion vectors.

The determining module 1230 is configured to determine a motion vector set from the MVPs and the candidate motion vectors, the motion vector set including a target MVP determined from the MVPs and a target motion vector determined from the candidate motion vectors.

The prediction module 1220 is further configured to perform interpolation mode transversal and motion mode transversal for each of the coding units based on the motion vector set to obtain a target interpolation mode and a target motion mode corresponding to the each coding unit.

In an embodiment, the acquisition module 1210 is further configured to acquire a quantity of the MVPs. The prediction module 1220 is further configured to: for an i-th MVP, in response to i being not greater than the quantity of the MVPs, perform motion estimation on the i-th MVP to obtain an i-th candidate motion vector, i being an integer. The prediction module 1220 is further configured to obtain n candidate motion vectors for n MVPs, the i-th MVP being corresponding to the i-th candidate motion vector, and n being the quantity of the MVPs.

In an embodiment, the prediction module 1220 is further configured to sequentially recombine each MVP and each candidate motion vector to obtain m combination relationships, a value of m being the square of n. The determining module 1230 is further configured to determine rate-distortion costs corresponding to the m combination relationships respectively, the rate-distortion cost being used to represent a pixel error status under the corresponding combination relationship; and determine the motion vector set from the m combination relationships based on the rate-distortion costs.

In an embodiment, the determining module 1230 is further configured to determine a target combination relationship with a minimum rate-distortion cost from the m combination relationships; and determining the motion vector set including the target MVP and the target motion vector in the target combination relationship.

Figure 13:
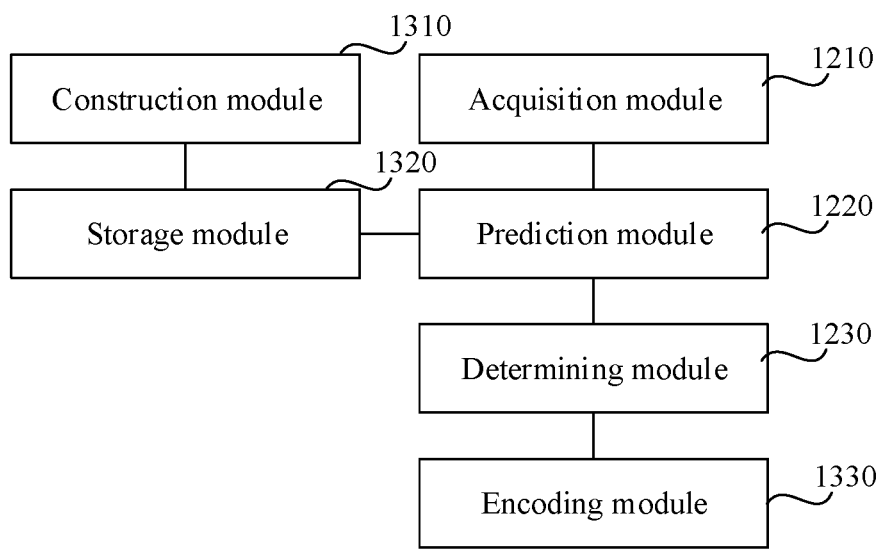
FIG. 13 is a structural block diagram of an inter prediction encoding apparatus according to another embodiment of this disclosure.

In an embodiment, as shown in FIG. 13, the apparatus further includes: a construction module 1310 and a storage module 1320.

The construction module 1310 is configured to construct a first array and a second array, where the first array is used for storing a distortion of the candidate motion vector corresponding to the MVP, and the second array is used for storing the candidate motion vector corresponding to the MVP.

The storage module 1320 is configured to store a distortion corresponding to the i-th candidate motion vector into the first array, the storage module 1320 being further configured to store the i-th candidate motion vector into the second array.

In an embodiment, the determining module 1230 is further configured to determine a reference frame corresponding to the target MVP; determine a number of bits consumed by an index of the target MVP. The apparatus further includes an encoding module 1330, configured to encode the coding unit based on the target MVP, the target interpolation mode, the target motion mode, the reference frame and the number of bits.

In an embodiment, the determining module 1230 is further configured to determine a reference frame indexing mode corresponding to the target MVP; and obtaining the reference frame based on the reference frame indexing mode and the index of the target MVP.

In an embodiment, the determining module 1230 is further configured to determine a difference between the target motion vector and the target MVP as the number of bits consumed by the index of the target MVP.

To sum up, according to the inter prediction encoding apparatus provided in the embodiment of this disclosure, in a scenario of encoding an image frame using a specified inter prediction mode (for example, NEWMV mode), a combination including a target MVP and a target motion vector (for example, an optimal combination) is determined first, and then an optimal interpolation mode and an optimal motion mode are determined for this combination, i.e., it is not necessary to perform interpolation mode traversal and motion mode traversal for all MVPs and motion vectors, thereby reducing the calculation amount of rate-distortion costs and the computational complexity, and further improving the encoding efficiency in the specified inter prediction mode.

The inter prediction encoding apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. Moreover, the embodiments of the inter prediction encoding apparatus provided in the foregoing embodiments belong to the same concept as that of the embodiments of the inter prediction encoding method. For details of a specific implementation process thereof, refer to the method embodiments. Details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 14:
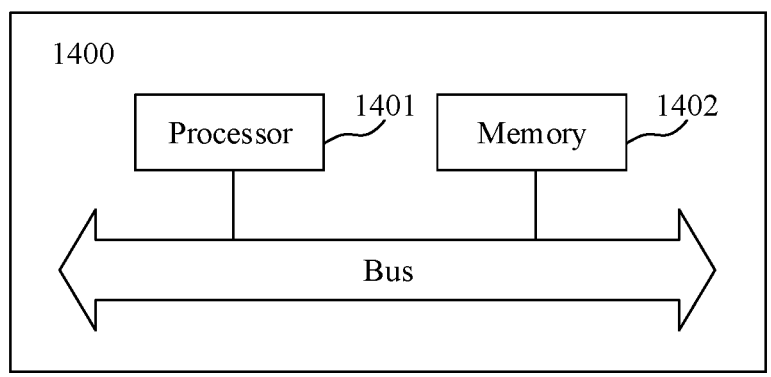
FIG. 14 is a structural block diagram of a computer device according to an embodiment of this disclosure.

FIG. 14 is a structural block diagram of a computer device 1400 according to an embodiment of this disclosure. The computer device 1400 may be a smartphone, a tablet computer, a Moving Picture Experts Group Audio Layer III (MP3) player, a Moving Picture Experts Group Audio Layer IV (MP4) player, a notebook computer, or a desktop computer; or may be a server. The computer device 1400 may be further referred to as another name such as user equipment, a portable terminal, a laptop terminal, or a desktop terminal.

The computer device 1400 includes processing circuitry, such as a processor 1401, and a memory 1402.

The processor 1401 may include one or more processing cores, and may be, for example, a 4-core processor or an 8-core processor. The processor 1401 may be implemented in at least one hardware form of a digital signal processor (DSP), a field-programmable gate array (FPGA), and a programmable logic array (PLA). The processor 1401 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to be responsible for rendering and drawing content that a display needs to display. In some embodiments, the processor 1401 may further include an AI processor. The AI processor is configured to process a computing operation related to machine learning.

The memory 1402 may include one or more computer-readable storage media that may be non-transitory. The memory 1402 may further include a high-speed random access memory and a non-volatile memory, for example, one or more disk storage devices or flash storage devices. In some embodiments, the non-transient computer-readable storage medium in the memory 1402 is configured to store at least one instruction, and the at least one instruction is used to be executed by the processor 1401 to implement the inter prediction encoding method.

The structure shown in FIG. 14 does not constitute any limitation on the computer device 1400, and the computer device may include more components or fewer components than those shown in the figure, or some components may be combined, or a different component deployment may be used.

In an embodiment of this disclosure, a computer-readable storage medium, such as a non-transitory computer-readable storage medium, is further provided. The computer-readable storage medium stores a computer program. The computer program, when executed by a processor, implements the inter prediction encoding method.

The computer-readable storage medium may include: a read-only memory (ROM), a random access memory (RAM), a solid state drive (SSD), an optical disc, or the like. The RAM may include a resistive RAM (ReRAM) and a dynamic RAM (DRAM). The sequence numbers of the foregoing embodiments of this disclosure are merely for description purpose, and do not indicate the preference among the embodiments.

In an exemplary embodiment, a computer program product or a computer program is provided. The computer program product or the computer program includes computer instructions, and the computer instructions are stored in a computer-readable storage medium. A processor of the computer device reads the computer instructions from the computer-readable storage medium and executes the computer instructions to cause the computer device to perform the inter prediction encoding method.

Information (including but not limited to object device information, object personal information, etc.), data (including but not limited to data used for analysis, stored data, displayed data, etc.) and signals involved in this application are authorized by the object or fully authorized by all parties, and the collection, use and processing of relevant data need to comply with relevant laws, regulations and standards of relevant countries and regions. For example, image frames, videos, etc. involved in this application are all obtained under full authorization.

The foregoing descriptions are merely exemplary embodiments of this disclosure, and are not intended to limit this disclosure. Other embodiments are within the scope of this disclosure.

What is claimed is:

1. An inter prediction encoding method, comprising:
dividing a picture into a plurality of coding units;
performing motion estimation traversal on motion vector predictions (MVPs) in a specified inter prediction mode to obtain candidate motion vectors;
determining a motion vector set from the MVPs and the candidate motion vectors, the motion vector set including a target MVP from the MVPs and a target motion vector from the candidate motion vectors; and
performing interpolation mode transversal and motion mode transversal for each of the coding units based on the motion vector set to obtain a target interpolation mode and a target motion mode corresponding to the respective coding unit.

2. The method according to claim 1, wherein the performing the motion estimation traversal comprises:
performing motion estimation on each of the MVPs to obtain a respective candidate motion vector.

3. The method according to claim 2, wherein the determining the motion vector set comprises:
combining each of the MVPs with a corresponding one of the candidate motion vectors to obtain m combination relationships, a value of m being a square of a quantity of the MVPs;
determining rate-distortion costs of the m combination relationships, each of the rate-distortion costs indicating a pixel error status of a respective one of the corresponding combination relationships; and
determining the motion vector set from the m combination relationships based on the rate-distortion costs.

4. The method according to claim 3, wherein the determining the motion vector set from the m combination relationships comprises:
determining a target combination relationship with a minimum rate-distortion cost from the m combination relationships; and
determining the motion vector set including the target MVP and the target motion vector in the target combination relationship.

5. The method according to claim 2, further comprising:
storing a distortion of each of the candidate motion vectors into a first array; and
storing each of the candidate motion vectors into a second array.

6. The method according to claim 1, further comprising:
determining a reference frame corresponding to the target MVP;
determining a number of bits used by an index of the target MVP; and
encoding a coding unit of the plurality of coding units based on the target MVP, the target interpolation mode, the target motion mode, the reference frame, and the number of bits.

7. The method according to claim 6, wherein the determining the reference frame comprises:
determining a reference frame indexing mode corresponding to the target MVP; and
obtaining the reference frame based on the reference frame indexing mode and the index of the target MVP.

8. The method according to claim 6, wherein the determining the number of bits comprises:
determining a difference between the target motion vector and the target MVP as the number of bits used by the index of the target MVP.

9. An inter prediction encoding apparatus, comprising:
processing circuitry configured to:
divide a picture into a plurality of coding units;
perform motion estimation traversal on motion vector predictions (MVPs) in a specified inter prediction mode to obtain candidate motion vectors;
determine a motion vector set from the MVPs and the candidate motion vectors, the motion vector set including a target MVP from the MVPs and a target motion vector from the candidate motion vectors; and
perform interpolation mode transversal and motion mode transversal for each of the coding units based on the motion vector set to obtain a target interpolation mode and a target motion mode corresponding to the respective coding unit.

10. The inter prediction encoding apparatus according to claim 9, wherein the processing circuitry is configured to:
perform motion estimation on each of the MVPs to obtain a respective candidate motion vector.

11. The inter prediction encoding apparatus according to claim 10, wherein the processing circuitry is configured to:
combine each of the MVPs with a corresponding one of the candidate motion vectors to obtain m combination relationships, a value of m being a square of a quantity of the MVPs;
determine rate-distortion costs of the m combination relationships, each of the rate-distortion costs indicating a pixel error status of a respective one of the corresponding combination relationships; and
determine the motion vector set from the m combination relationships based on the rate-distortion costs.

12. The inter prediction encoding apparatus according to claim 11, wherein the processing circuitry is configured to:
determine a target combination relationship with a minimum rate-distortion cost from the m combination relationships; and
determine the motion vector set including the target MVP and the target motion vector in the target combination relationship.

13. The inter prediction encoding apparatus according to claim 10, wherein the processing circuitry is configured to:
store a distortion of each of the candidate motion vectors into a first array; and
store each of the candidate motion vectors into a second array.

14. The inter prediction encoding apparatus according to claim 9, wherein the processing circuitry is configured to:
determine a reference frame corresponding to the target MVP;
determine a number of bits used by an index of the target MVP; and
encode a coding unit of the plurality of coding units based on the target MVP, the target interpolation mode, the target motion mode, the reference frame, and the number of bits.

15. The inter prediction encoding apparatus according to claim 14, wherein the processing circuitry is configured to:
determine a reference frame indexing mode corresponding to the target MVP; and
obtain the reference frame based on the reference frame indexing mode and the index of the target MVP.

16. The inter prediction encoding apparatus according to claim 14, wherein the processing circuitry is configured to:
determine a difference between the target motion vector and the target MVP as the number of bits used by the index of the target MVP.

17. A non-transitory computer-readable storage medium, storing instructions which when executed by a processor cause the processor to perform:

dividing a picture into a plurality of coding units;

performing motion estimation traversal on motion vector predictions (MVPs) in a specified inter prediction mode to obtain candidate motion vectors;

determining a motion vector set from the MVPs and the candidate motion vectors, the motion vector set including a target MVP from the MVPs and a target motion vector from the candidate motion vectors; and performing interpolation mode transversal and motion mode transversal for each of the coding units based on the motion vector set to obtain a target interpolation mode and a target motion mode corresponding to the respective coding unit.

18. The non-transitory computer-readable storage medium according to claim 17, wherein the performing the motion estimation traversal comprises:

performing motion estimation on each of the MVPs to obtain a respective candidate motion vector.

19. The non-transitory computer-readable storage medium according to claim 18, wherein the determining the motion vector set comprises:

combining each of the MVPs with a corresponding one of the candidate motion vectors to obtain m combination relationships, a value of m being a square of a quantity of the MVPs;

determining rate-distortion costs of the m combination relationships, each of the rate-distortion costs indicating a pixel error status of a respective one of the corresponding combination relationships; and determining the motion vector set from the m combination relationships based on the rate-distortion costs.

20. The non-transitory computer-readable storage medium according to claim 19, wherein the determining the motion vector set from the m combination relationships comprises:

determining a target combination relationship with a minimum rate-distortion cost from the m combination relationships; and determining the motion vector set including the target MVP and the target motion vector in the target combination relationship.

\* \* \* \* \*